(12) United States Patent
Li et al.

(10) Patent No.: US 9,219,602 B2
(45) Date of Patent: Dec. 22, 2015

(54) METHOD AND SYSTEM FOR SECURELY COMPUTING A BASE POINT IN DIRECT ANONYMOUS ATTESTATION

(75) Inventors: Jiangtao Li, Beaverton, OR (US); Ernie Brickell, Hillsboro, OR (US); Willard Monten Wiseman, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 239 days.

(21) Appl. No.: 13/997,755

(22) PCT Filed: Dec. 27, 2011

(86) PCT No.: PCT/US2011/067384
§ 371 (c)(1),
(2), (4) Date: Jun. 25, 2013

(87) PCT Pub. No.: WO2013/100903
PCT Pub. Date: Jul. 4, 2013

(65) Prior Publication Data
US 2014/0205090 A1    Jul. 24, 2014

(51) Int. Cl.
| | |
|---|---|
| H04L 9/00 | (2006.01) |
| H04L 9/30 | (2006.01) |
| H04L 9/08 | (2006.01) |
| H04L 9/32 | (2006.01) |
| H04K 1/00 | (2006.01) |

(52) U.S. Cl.
CPC ............ *H04L 9/0816* (2013.01); *H04L 9/3066* (2013.01); *H04L 9/3252* (2013.01); *H04L 2209/127* (2013.01)

(58) Field of Classification Search
None
See application file for complete search history.

(56) References Cited

U.S. PATENT DOCUMENTS

| | | | | |
|---|---|---|---|---|
| 5,497,423 A | * | 3/1996 | Miyaji | ............................ 380/30 |
| 7,844,614 B2 | | 11/2010 | Brickell et al. | |
| 2002/0025034 A1 | * | 2/2002 | Solinas | ............................ 380/30 |
| 2009/0210716 A1 | * | 8/2009 | Chen | ............................ 713/176 |
| 2009/0307492 A1 | * | 12/2009 | Cao et al. | ....................... 713/169 |
| 2010/0082973 A1 | * | 4/2010 | Brickell et al. | ............... 713/155 |
| 2010/0169650 A1 | * | 7/2010 | Brickell et al. | ............... 713/176 |
| 2010/0322422 A1 | * | 12/2010 | Al-Gahtani et al. | ........... 380/255 |
| 2014/0173274 A1 | * | 6/2014 | Chen et al. | ..................... 713/155 |

FOREIGN PATENT DOCUMENTS

WO    2013100903 A1    7/2013

OTHER PUBLICATIONS

International Search Report and Written Opinion received for International Application No. PCT/US2011/067384, mailed Sep. 24, 2012, 10 pages.

Brickell et al., "Direct Anonymous Attestation," Feb. 11, 2004, retrieved from: <https://eprint.iacr.org/2004/205.pdf>, 28 pages.

(Continued)

*Primary Examiner* — Shin-Hon Chen
(74) *Attorney, Agent, or Firm* — Barnes & Thornburg LLP

(57) ABSTRACT

A method and system computes a basepoint for use in a signing operation of a direct anonymous attestation scheme. The method and system includes computing a basepoint at a host computing device and verifying the base point at a trusted platform module (TPM) device.

21 Claims, 4 Drawing Sheets

(56) References Cited

OTHER PUBLICATIONS

Brickell et al., "Enhanced Privacy ID from Bilinear Pairing," Feb. 25, 2009, retrieved from: <https://eprint.iacr.org/2009/095.pdf>, 23 pages.

Brickell et al., "A Pairing-Based DAA Scheme Further Reducing TPM Resources," Feb. 9, 2010, retrieved from: <https://eprint.iacr.org/2010/067.pdf>, 14 pages.

Trusted Computing Group, Inc., "TPM Main Specification: Part 1 Design Principles," version 1.2, revision 62, Oct. 2, 2003, 161 pages.

* cited by examiner

METHOD AND SYSTEM FOR SECURELY COMPUTING A BASE POINT IN DIRECT ANONYMOUS ATTESTATION

BACKGROUND

As computing devices and electronic communication networks continue to proliferate in a variety of forms, information security remains an important concern. Cryptographic techniques are often used to ensure that electronic information is safely delivered to its intended recipient, and to determine whether devices and/or processes requesting access to information or other devices should be granted such access. Public key cryptography is a technique that typically uses two keys: a private key, which remains secret; and a public key, which may be freely disclosed, to define membership in a group of trusted computing devices. While the public key and the private key are related, the private key cannot feasibly be determined from the public key.

Public key cryptography can be used to implement digital signature schemes. In general, a digital signature scheme is a mathematical framework for authenticating an electronic message or document. If a digital signature is determined to be valid, it can be inferred that the message encoded with the signature originated from a trusted source and has not been modified during transit. In public key digital signature schemes, a private key is used to create a digital signature of a message, while a corresponding public key is used to check the validity of the digital signature.

A direct anonymous attestation (DAA) scheme is a digital signature scheme for anonymous attestation and authentication of a computing device using the public key approach. Direct anonymous attestation schemes permit a computing device's membership in a trusted group to be verified by a remote entity (e.g., a software process, hardware device, or server) without the computing device revealing information about its identity. An elliptic curve-based DAA scheme is a type of DAA scheme in which an elliptic curve is defined and parameters of the elliptic curve are used to generate signature keys for members of the group of trusted computing devices.

The Trusted Platform Module (TPM) specification is a published specification, authored by the Trusted Computing Group, which describes a hardware-based implementation of a DAA scheme for verifying the integrity of computing devices. The term, "TPM" may be used to refer to implementations of that scheme.

Some DAA schemes, including the TPM version 1.2 specification published by the Trusted Computing Group, divide the process of signing a message with a digital signature between two devices. This allows resource-intensive computations to be performed by a device that has the computational power to handle them.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
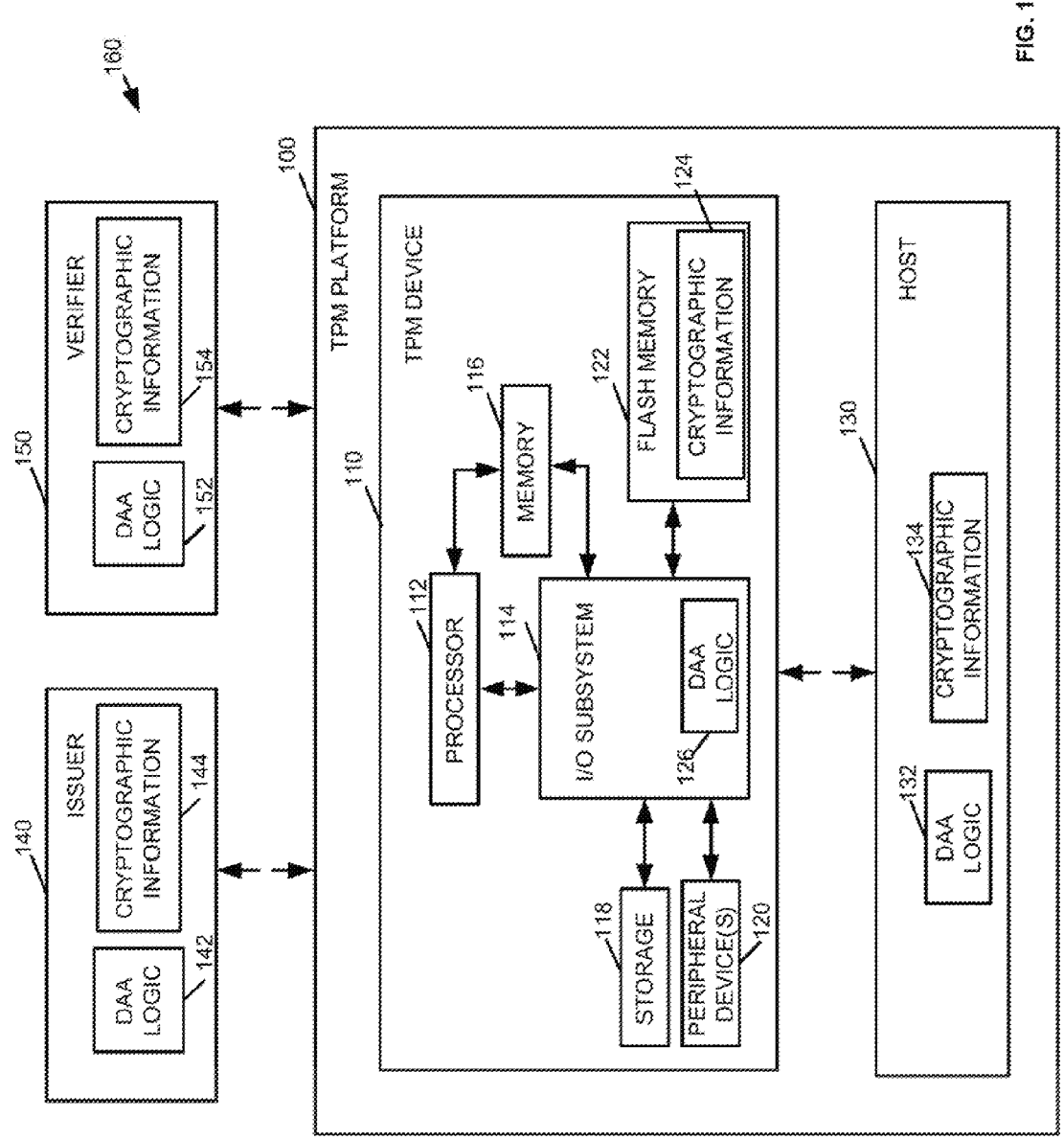
FIG. 1 is a simplified block diagram of at least one embodiment of an information security system for a computing device.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions carried by or stored on a transitory or non-transitory machine-readable medium, which may be read and executed by one or more processors. A machine-readable medium may be embodied as any device, mechanism or physical structure for storing or transmitting information in a form readable by a machine (e.g., a computing device). For example, a machine-readable medium may be embodied as read only memory (ROM); random access memory (RAM); magnetic disk storage media; optical storage media; flash memory devices; mini- or micro-SD cards, memory sticks, electrical signals, and others.

In the drawings, specific arrangements or orderings of schematic elements, such as those representing devices, modules, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages.

Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. Also, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

Herein, alphanumeric characters and/or mathematical symbols, or a combination thereof, may be used to represent data values, variables, coefficients, functions, equations or portions thereof. It should be understood that once defined, a character or symbol may be repeated throughout the disclosure, and that, unless otherwise stated, such repeated instances of a character or symbol refer to the same character or symbol as initially defined.

Referring now to FIG. 1, an illustrative information security system 160 includes a Trusted Platform Module (TPM) platform 100, which is communicatively coupled to an issuer computing device 140 and a verifier computing device 150 in an elliptic curve-based direct anonymous attestation (DAA) security scheme. In operation, the issuer 140 generates a group public key that can be used to define a group of trusted computing devices, which, in the illustrative embodiment, includes the TPM platform 100.

As described in more detail below, the TPM platform 100 interfaces with the issuer 140 to create a signature key. The signature key is used by the TPM platform 100 to generate a digital signature. When the TPM platform 100 desires access to information or to send information to another computing device that is secured using the elliptic curve-based DAA scheme, the TPM platform 100 attempts to prove its membership in the trusted group by sending a message encrypted with the digital signature to the verifier 150. If the digital signature is valid and has not been revoked, the TPM platform 100's attempt to prove membership in the trusted group should be successful.

In the Trusted Computing Group (TCG) context, the TPM platform 100 may be embodied as a combination of a Trusted Platform Module and a host machine to which the TPM can be communicatively coupled. The illustrative TPM platform 100 divides the task of generating the digital signature between a TPM device 110 and a host 130. In accordance with the elliptic curve-based DAA scheme, the host 130 computes a basepoint, which is a point on an elliptic curve, and the TPM device 110 verifies that the basepoint is valid, before the digital signature is created. To reduce the risk of static Diffie-Hellman attacks and/or other security issues that could compromise the authenticity of the digital signature, the host 130 is required to compute the basepoint using a hash function that is specially designed to hash a string of arbitrary length to a point on the elliptic curve. In this way, the host 130 is prevented from selecting the basepoint without the involvement of the TPM device 110, but is still able to bear a large portion of the computational burden of the signing process.

To verify the basepoint, the TPM device 110 computes the "x" coordinate of the basepoint using a regular hash function that outputs a fixed-length string. Since the TPM device 110 is only required to compute a regular hash function to output a single value rather than coordinates of a point on the elliptic curve, the computational overhead at the TPM device 110 is minimized.

Referring further to FIG. 1, the illustrative TPM device 110 includes at least one processor 112, a memory 116, an input/output (I/O) subsystem 114, a storage device 118, one or more peripheral devices 120, and a flash memory 122. Cryptographic information 124, such as a group member private key, is stored in memory of the TPM device 110, and DAA logic 126 is installed on the TPM device 110. In the illustrative embodiment, the cryptographic information 124 is stored in the flash memory 122, which is non-volatile, and the DAA logic 126 resides in the I/O subsystem 114. In other embodiments, all or other portions of the DAA logic 126 and/or cryptographic information 124 may reside in other locations accessible to the processor 112. For example, portions of the DAA logic 126 and/or the cryptographic information 124 may be loaded into the memory 116 during operation of the TPM device 110, for faster processing or other reasons.

The TPM device 110 may be embodied in or as any type of computing device, such as, for example, a desktop computer system, a laptop or tablet computer system, a server, an enterprise computer system, a network of computers, a handheld computing device, or other electronic device depending on the particular application.

The illustrative processor 112 may be embodied as one or more processor cores or logical sections of a single core. In addition to cache memory, the processor 112 and/or its core(s) include, or are otherwise communicatively coupled to, the memory 116. Portions of the memory 116 may be embodied as any type of suitable memory device, such as a dynamic random access memory device (DRAM), synchronous dynamic random access memory device (SDRAM), double-data rate dynamic random access memory device (DDR SDRAM) and/or other volatile memory devices.

The processor 112 is also communicatively coupled to the I/O subsystem 114. Although not specifically shown, the I/O subsystem 114 typically includes a memory controller (e.g., a memory controller hub (MCH) or northbridge), an input/ output controller (e.g., an input/output controller hub (ICH) or southbridge), and a firmware device (e.g., BIOS or UEFI). Of course, in other embodiments, I/O subsystems having other configurations may be used. For example, in some embodiments, the I/O subsystem 114 may form a portion of a system-on-a-chip (SoC) and be incorporated, along with the processor 112 and other components of the TPM device 110, on a single integrated circuit chip. As such, it will be appreciated that each component of the UO subsystem 114 may be located on a common integrated circuit chip in some embodiments.

The I/O subsystem 114 is communicatively coupled to the storage 118. Portions of the storage 118 may be embodied as any suitable device for storing data and/or instructions, such as disk storage (e.g. hard disks), memory cards, memory sticks, and/or others. In some embodiments, an operating system, application code and/or data structure may be embodied in the storage 118.

The I/O subsystem 114 may be communicatively coupled to one or more peripheral devices 120. The peripheral device(s) 120 may include one or more network interfaces, graphics and/or video adaptors, keyboard, touchscreens, displays, printers, data storage devices, and/or other peripheral devices, depending upon, for example, the intended use of the TPM device 110. Further, it should be appreciated that the TPM device 110 may include other components, sub-components, and devices not illustrated in FIG. 1 for clarity of the description.

The host 130, issuer 140 and verifier 150 are, in the illustrative embodiment, computing devices. While details of the specific structure of the host 130, issuer 140, and verifier 150 have been omitted so as not to obscure the disclosure, it should be understood that each of these devices generally includes one or more processors, memory, and an I/O subsystem similar or analogous to those shown and described above in connection with the TPM device 110. For example, in some embodiments, the issuer 140 may be embodied as a computing device associated with a computing device provider (e.g. a hardware or software manufacturer). In some embodiments, the TPM platform 100 may be embodied as a hardware device (e.g., a platform controller hub (PCH), central processing unit (CPU), or graphics processor (e.g., LRB)), in which the TPM device 110 and the host 130 are embodied in the hardware device. In other embodiments, the TPM device 110 and the host 130 may be embodied as separate computing devices communicatively coupled by a network. In some embodiments, the verifier 150 may be embodied as software residing on the host 130 or another computing device, such as a server on the Internet or another hardware device. In some embodiments, the TPM device 110 is a device that has significantly less computational resources (e.g., processing power, memory, etc.) than the host 130.

DAA logic 132, 142, 152 and cryptographic information 134, 144, 154 configured to implement the elliptic curve-based DAA scheme are embodied in each of the host 130, issuer 140, and verifier 150, respectively (e.g. in memory or storage). Details relating to the DAA logic 132, 142, 152 and cryptographic information 134, 144, 154 are described below in connection with FIGS. 2-4.

In general, the components of the TPM device 110, the host 130, the issuer 140, the verifier 150, and the information security system 160 are communicatively coupled as shown in FIG. 1, by one or more signal paths, which are represented schematically as double-headed arrows. Such signal paths may be embodied as any type of wired or wireless signal paths capable of facilitating communication between the respective devices. For example, the signal paths may be embodied as any number of wires, printed circuit board traces, via, bus, point-to-point interconnects, intervening devices, and/or the like. Double-headed arrows with dashed lines are used in FIG. 1 to indicate that a signal path may be embodied as a wired or wireless communication network, which may include a public or private LAN, Ethernet network, the Internet, and/or others.

Figure 2:
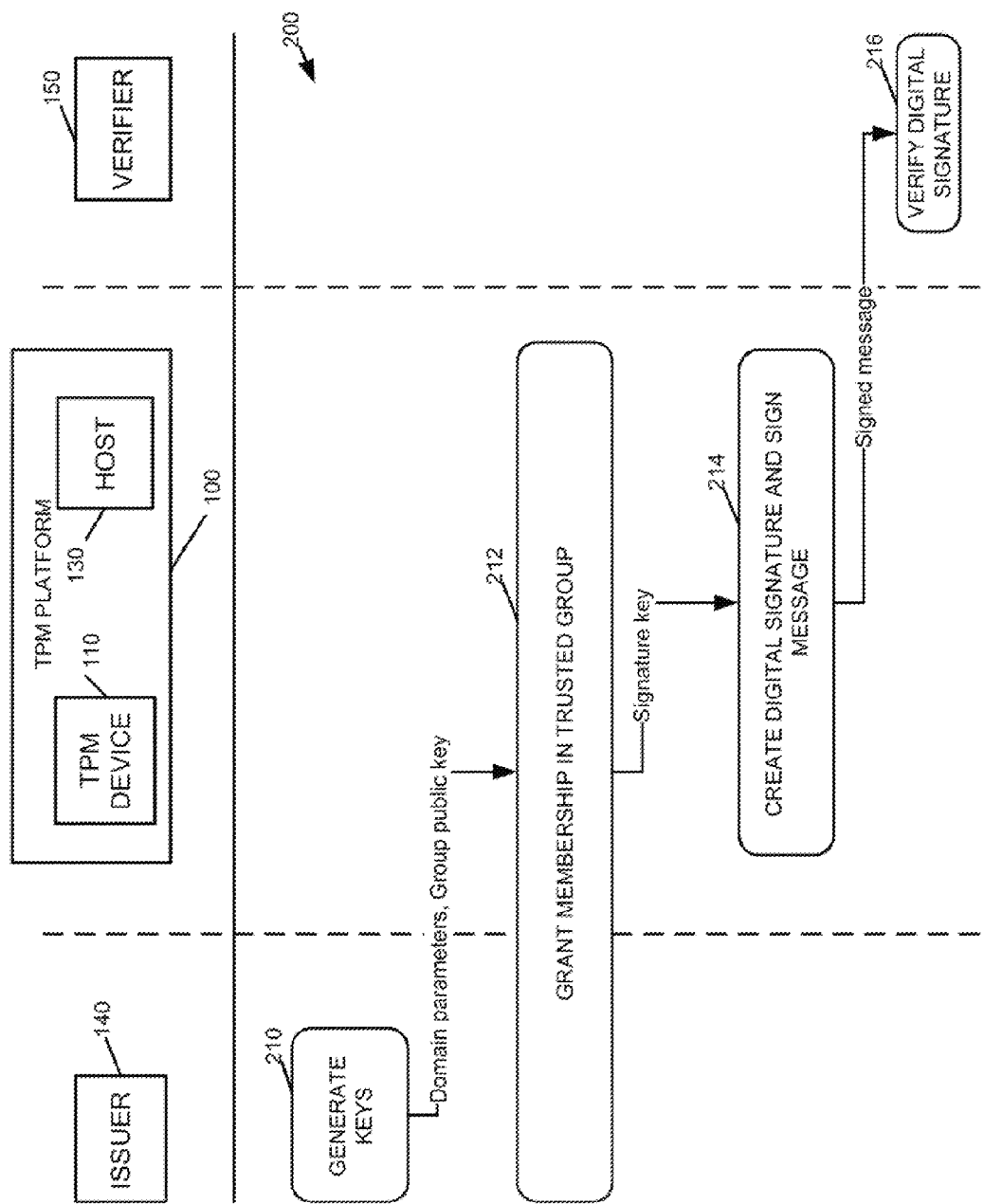
FIG. 2 is a simplified module diagram for at least one embodiment of a direct anonymous attestation security scheme.

Referring now to FIG. 2, an illustrative DAA scheme 200 is shown. The DAA scheme 200 includes computer instructions, modules, routines, processes or the like 210, 212, 214, and 216, portions of which are executed by the TPM platform 100, TPM device 110, host 130, issuer 140, and verifier 150. At block 210, the issuer 140 generates domain parameters of the DAA scheme, which include the elliptic curve parameters. The issuer 140 uses the domain parameters to generate a group issuing key or "master" key. The issuer 140 also uses the domain parameters to generate a group public key, which can be used to define a group of trusted computing devices.

At block 212, the issuer 140 uses the master key to issue a unique signature key to each member of the trusted group (e.g., the TPM platform 100). The signature key is generated without revealing any information about the master key. In other words, the issuer 140 keeps the master key secret. The signature key includes a unique group private key and a membership credential. As shown in the illustrative embodiment and described below in connection with FIG. 3, the process of creating a signature key for the TPM platform 100 involves interaction between the issuer 140 and the TPM platform 100.

At block 214, the TPM platform 100) uses its signature key, the group public key, and a basename supplied by the verifier 150, among other parameters, to generate a digital signature and sign a message with the digital signature without revealing any information about the group member private key. In other words, the group member private key is used to create the digital signature, but the digital signature does not include any information about the group member private key. In accordance with the illustrative embodiment, the digital signature may be referred to as a "DAA signature."

In some embodiments, the basename may be randomly generated (e.g., it is a special symbol, such as "⊥"). In cases where the basename is randomly generated, the resulting digital signature will be truly anonymous (i.e., each digital signature will be unique because a different basename is generated each time a signature is created) and therefore unlinkable. In other embodiments, the basename may be supplied by the verifier 150. If the basename is supplied by the verifier 150, it may be used in multiple digital signatures, and those digital signatures are considered linkable. As shown in the illustrative embodiment and described below in connection with FIGS. 3 and 4, the process of creating a digital signature for a message to be sent by the TPM platform 100 involves interaction between the TPM device 110 and the host 130.

At block 216, the verifier 150 uses the group public key to validate a digital signature received from a computing device (e.g. the TPM platform 100). More specifically, the verifier 150 determines, without knowing the group member private key, whether the digital signature has been created by a computing device that has been issued a valid group member private key. Optionally, the verifier 150 may also determine whether the digital signature is on a revocation list, i.e., whether the digital signature, even if valid, has been revoked by the issuer 140.

Figure 3:
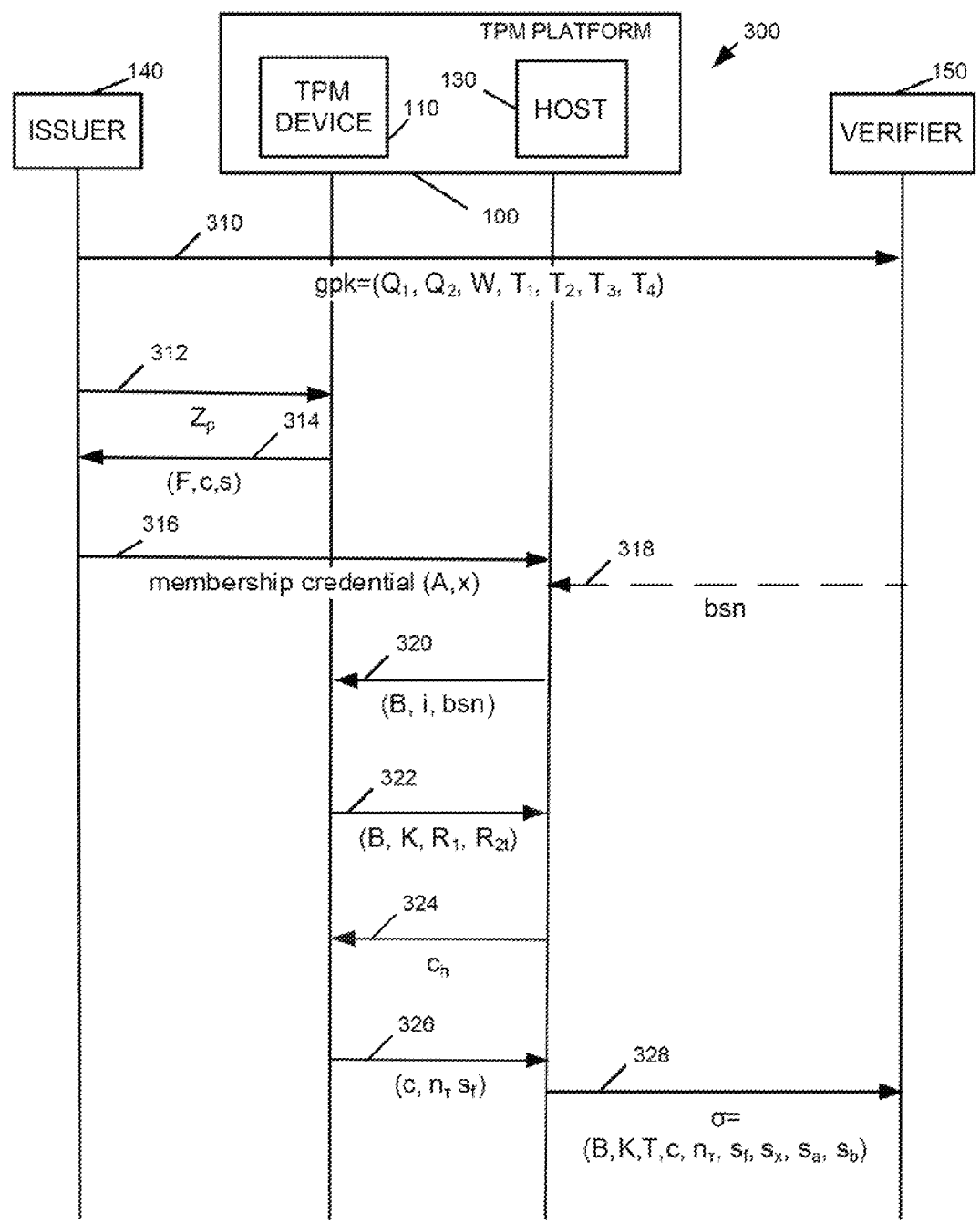
FIG. 3 is a simplified sequence diagram for at least one embodiment of a method of generating a digital signature for a computing device.

Referring now to FIG. 3, an illustrative method 300 for implementing the DAA scheme 200 is shown. Among other things, execution of the method 300 involves data transmissions 310, 312, 314, 316, 318, 320, 322, 324, 326, 328 by and among the issuer 140, TPM device 110, host 130 and verifier 150 as shown and described below. It should be understood that the illustrative method 300 is just one example of an elliptic curve-based DAA scheme, and that aspects of this disclosure are applicable more generally to any elliptic curve-based DAA scheme. Moreover, it should be understood that sequence numbers (e.g., (1), (2), . . . ) used to identify steps or processes of the method 300 are provided only for readability and are not meant to imply that all of the enumerated steps or processes are required to be performed in any certain order.

At event 310, the issuer 140 outputs a group public key, gpk=$(Q_1, Q_2, W, T_1, T_2, T_3, T_4)$ and makes the group public key accessible to the verifier 150 (e.g. by digital transmission over a signal path or network). Prior to event 310, the issuer 140 executes a series of mathematical processes (e.g., at block 210) to determine the parameters that make up the group public key, as follows:

(1) The issuer 140 chooses an asymmetric bilinear group pair $(G_1, G_2)$ of large prime order p and an associated pairing function e: $G_1 \times G_2 \rightarrow G_T$, where $G_1$ and $G_2$ are elliptic curves, $G_1$ is the elliptic curve on which a basepoint B is located, p is a prime number, and e is a mathematical pairing function configured to map a point in $G_1$ and a point in $G_2$ into an element in $G_T$. In general, p is a large prime number. The size of p is determined by the security strength of the DAA scheme as designed for a particular application. In some embodiments, the security strength may be set to 256-bit, while in other embodiments, an 80-bit, 112-bit, or 128-bit security strength, or higher or lower security strength, may be used.

(2) The issuer 140 then randomly selects a point $P_1$ of $G_1$ using a random number generator, where $P_1$ comprises x and y coordinates of a point on $G_1$.

(3) The issuer 140 then randomly selects a point $P_2$ of $G_2$ using a random number generator, where $P_2$ comprises x and y coordinates of a point on $G_2$.

(4) The issuer 140 chooses two hash functions $H_1$: $\{0, 1\}^* \rightarrow Z_p$ and $H_2$: $\{0, 1\}^* \rightarrow G_1$, where $H_2$ is a special hash function that hashes a string into an element in $G_1$, $H_1$ is a regular hash function that hashes a string into a fixed length string, and $Z_p$ is the set of non-negative integers less than p. More specifically, $H_2$ is a special hash function that takes the basename string bsn, which is an arbitrary length message, as input, and outputs B, which is an element of $G_1$, i.e., B=$H_2$(bsn). The steps for computing B using $H_2$ are as follows:

(a) Set a counter, i=0, where 1 is a 32-bit unsigned integer.
(b) Compute x=Hash(I∥bsn) mod q, where Hash( ) is a regular hash algorithm.
(c) Compute t=$(x^3+a \cdot x+b)$ mod q.
(d) Compute y=SquareRoot(t) mod q.
(e) If computing the square root fails, set i=i+1 and return to step (b).
(f) Set B=(x,y).
(g) If the cofactor h>1, then compute [h]B and output B.

(5) The issuer 140 chooses random elements $Q_1, Q_2$ from $G_1$ using a random number generator, where each of $Q_1$ and $Q_2$ comprises x and y coordinates of a point on $G_1$.

(6) The issuer 140 chooses a random integer y from $Z_p$, where Zdp is the set of non-negative integers less than p, e.g., $\{0, 1, 2, \ldots, p-1\}$. The issuer 140 computes W=$[y]P_2$, where $[y]P_2$ denotes point multiplication on the elliptic curve $G_2$.

(7) The issuer computes $T_1$=e$(P_1, P_2)$, $T_2$=e$(Q_2, P_2)$, $T_3$=e$(Q_2, P_2)$, and $T_4$=e$(Q_2, W)$, where e is the pairing function described above.

(8) The issuer 140 outputs the following: domain parameters=$(G_1, G_2, G_T, p, e, P_1, P_2, H_1, H_2)$, which define the DAA scheme; and also outputs the group public key=$(Q_1, Q_2, W, T_1, T_2, T_3, T_4)$ and the group issuing key=y.

The events 312, 314, and 316 relate to the process of granting the TPM platform 100 membership in the trusted group associated with the group public key gpk (e.g., block 212 of FIG. 2). At event 312, the issuer allows the TPM platform 100 access to Z so that the TPM platform 100 can select a group member private key. Prior to event 312, the issuer 140 performs the following:

(1) The issuer chooses a nonce $n_1 \in \{0, 1\}^2$. In general, a nonce is an arbitrary number that is used only once to sign a cryptographic communication. For example, the nonce may be a random or pseudo random number.

(2) The issuer sends $n_1$ to the TPM platform 100 (or otherwise allows access to $n_1$ by the TPM platform 100).

At event 312, the TPM platform 100:

(3) chooses at random the group member private key f from $Z_p$. Following the event 312, the TPM platform 100 does the following:

(4) The TPM platform 100 chooses at random integer r from $Z_p$.

(5) The TPM platform 100 computes F=$[f]Q_1$ and R=$[r]Q_1$, using point multiplication on the elliptic curve $G_1$.

(6) The TPM platform 100 computes c=$H_1$(p, $P_1, P_2, Q_1, Q_2$, W, F, R, $n_1$).

(7) The TPM platform 100 computes s=(r+c·f) mod p, where mod is a modular arithmetic operation.

At event 314, the TPM platform 100:

(8) sends the commitment parameters of the group member private key (F, c, s) to the issuer 140 (or otherwise allows access to (F, c, s) by the issuer 140). Following the event 314, the following operations are performed by the issuer 140:

(9) The issuer 140 computes R=$[s]Q_1-[c]F$ using point multiplication on the elliptic curve $G_1$.

(10) The issuer 140 verifies that c=$H_1$(p, $P_1, P_2, Q_1, Q_2$, W, F, R, $n_1$). This can be done by computing the hash value of the right hand side of the equation and comparing the result to c as computed by the TPM platform 110 above.

(11) The issuer 140 chooses a random integer x from $Z_p$.

(12) The issuer 140 computes A=$[1/(x+y)](P_1+F)$.

At event 316, the issuer 140:

(13) sets (A, x) as the membership credential for the TPM platform 100 and sends it to the TPM platform 100 (or otherwise allows access to (A, x) by the TPM platform 100). Following the event 316:

(14) The TPM platform 100 verifies (A, x) by checking that e(A, W+$[x]P_2$)=e$(P_1+F, P_2)$. If the TPM platform 100 successfully verifies the membership credential (A, x), then:

(15) The signature key for the platform is (f, A, x), where f is the group member private key and (A, x) is the membership credential.

Once the TPM platform 100 has obtained a signature key, the TPM platform 100 can create a DAA signature and use the DAA signature to sign a message. The events 316, 318, 320, 322, 324, 326, and 328 relate to the DAA signature creation and signing process. The illustrative DAA signing process is jointly performed by the TPM device 110 and the host 130 as shown in FIG. 3. Using the group public key $(Q_1, Q_2, W, T_1, T_2, T_3, T_4)$, the group member signature key (f, A, x), a linking basename bsn, a nonce $n_v \in \{0, 1\}^t$, and a message m$\in \{0, 1\}^*$ to be signed, the illustrative signature process is as follows:

(1) The TPM device 110 accesses the group member private key f while the host 130 is given access to the membership credential (A, x).

Figure 4:
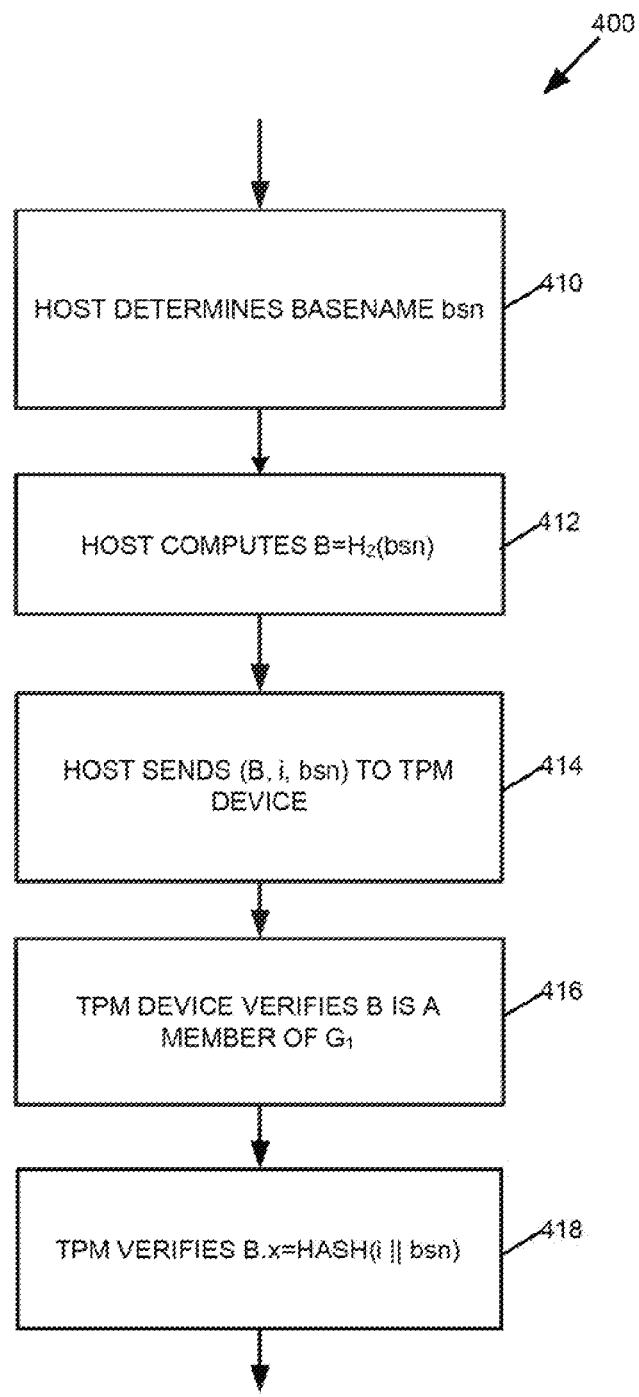
FIG. 4 is a simplified flow diagram of at least one embodiment of a method for computing and verifying a basepoint usable to create a digital signature.

(2) A basepoint B, which is a point on the elliptic curve $G_1$ having x and y coordinates B.x and B.y, is determined according to a method 400, an illustrative embodiment of which is shown in FIG. 4 and described below. The events 318, 320, and 322 are related to the determination of B. Once B has been determined and verified:

(3) The TPM device 110 computes K=[f]B using point multiplication on the elliptic curve $G_1$.

(4) The TPM device 110 chooses a random integer $r_f$ from $Z_p$ using a random number generator.

(5) The TPM device 110 computes $R_1=[r_f]B$ and $R_{2t}=[r_f]Q_1$ using point multiplication on the elliptic curve $G_1$.

At event 322, the TPM device 110:

(6) sends the host pre-computation result, (B, K, $R_1$, $R_{2t}$) to the host 130 (or otherwise allows access to (B, K, $R_1$, $R_{2t}$) by the host 130).

Following the event 322:

(7) The host 130 chooses a random integer a from $Z_p$ and computes b=(a·x) mod p.

(8) The host 130 computes T=A+[a]$Q_2$ using point multiplication on the elliptic curve $G_1$.

(9) The host 130 randomly picks three integers $r_x$, $r_a$, $r_b$, from $Z_p$ using a random number generator.

(10) The host 130 computes $R_2=e(R_{2t}-[r_x]T+[r_b]Q_2, P_2)·T_4^{ra}$ using the pairing function e and point multiplication on the elliptic curve $G_1$.

(11) The host 130 computes the host digest, $c_h=H_1(p, P_1, P_2, Q_1, Q_2, W, B, K, T, R_1, R_2, n_v)$.

At event 324, the host 130:

(12) sends the host digest, $c_h$ to the TPM device 110 (or otherwise allows access to $c_h$, by the TPM device 110).

Following the event 324:

(13) The TPM device 110 chooses a nonce $n_T \in \{0, 1\}^t$.

(14) The TPM device 110 computes $c=H_1(c_h, n_T, m)$.

(15) The TPM device 110 computes $s_f=(r_f+c·f)$ mod p, where mod is a modular arithmetic operation.

At event 326, the TPM device 110:

(16) sends the TPM portion of the DAA signature, (c, $n_T$, $s_f$), to the host 130 (or otherwise allows access to (c, $n_T$, $s_f$) by the host 130).

Following the event 326:

(17) The host 130 computes $s_x=(r_x+c·x)$ mod p, $s_a=(r_a+c·a)$ mod p, $s_b=(r_b+c·b)$ mod p, where mod is a modular arithmetic operation.

At event 328, the host 130:

(18) outputs the anonymous digital signature σ=(B, K, T, c, $n_T$, $s_f$, $s_x$, $s_b$).

When the verifier 150 receives the digital signature, it verifies the signature using the following inputs: a message m, a linking base bsn, which is a string of arbitrary length, a nonce $n_v \in \{0, 1\}^t$, a digital signature (B, K, T, c, $n_T$, $s_f$, $s_x$, $s_a$, $s_b$), and a group public key ($Q_1$, $Q_2$, W, $T_1$, $T_2$, $T_3$, $T^4$). In the illustrative embodiment, the verifier 150 may:

(1) Verify that B, K, T are elements in the elliptic curve $G_1$. This can be done by checking whether $y^2=x^3+ax+b$, for the x and y coordinates of each of the points B, K, and T.

(2) Verify that $s_f$, $s_x$, $s_a$, $s_b$ are integers in $Z_p$. This can be done by determining whether the integers $s_f$, $s_x$, $s_a$, and $s_b$ are non-negative integers having a value less than p.

(3) If bsn≠⊥ (i.e., bsn is not random), verify that $B=H_2$(bsn).

(4) Compute $R_1=[s_f]B-[c]K$.

(5) Compute $R_2=e(T, [-s_x]P2-[c]W)·[c]W) ·T_1^c·T_2^{sf}·T_3^{sb}·T_4^{sb}$.

(6) Verify that $c=H_1(H_1(p, P_1, P_2, Q_1, Q_2, W, B, K, T, R_1, R_2, n_v), n_T, m)$. This can be done by computing the hash value of the right hand side of the equation and comparing the result to c as computed by the TPM platform 110 above.

(7) Optionally, call a revocation checking process.

(8) If any of the above verification steps fails, the verifier 150 outputs 0 (indicating an invalid signature), otherwise, the verifier 150 outputs 1 (indicating a valid signature).

Referring now to FIG. 4, an illustrative method 4100 for performing step (2) of the above signing process is shown. At block 410, the host 130 determines whether the basename string of arbitrary length bsn is random (e.g., bsn=⊥), or is a linking basename supplied by the verifier 150. If bsn=⊥, the host 130 chooses a random bsn string. Some examples of a basename supplied by the verifier 150 include a unique name, IP address, or web address associated with the verifier 150, or the verifier 150's public key. The event 318 of FIG. 3 illustrates the determination of bsn by the host 130, with the dashed-line arrow indicating that the bsn may be obtained from the verifier 150.

At block 412, the host 130 computes $B=H_2$(bsn) using the above-described special-purpose hash function, which is configured to hash a string to a point on an elliptic curve. The intermediate result, the counter i value, which is the value of the counter i of the hash iteration that succeeded in finding a point on the elliptic curve, is also output. In the illustrative embodiment, i is a 32-bit unsigned integer. As mentioned above, B is a point on the elliptic curve $G_1$, and therefore comprises an "x" coordinate and a "y" coordinate, e.g., B.x and B.y.

At block 414, the host 130 sends the basepoint, counter, and basename string (B, i, bsn) to the TPM device 110, or otherwise allows access to (B, i, bsn) by the TPM device 110, as shown by the event 320 of FIG. 3. At block 416, the TPM device 110 verifies that B is a valid point in $G_1$. This can be done by calculating B.$x^3$+a*B.x+b and comparing the result to B.$y^2$. If B is a valid point in $G_1$, then B.$y^2$=B.$x^3$+a*B.x+b.

At block 418, the TPM device 110 verifies that the x coordinate of B, B.x=Hash(i||bsn) mod q, where: Hash( ) is a regular hash function, such as the standard hash function SHA-256 or any other suitable collision resistant hash function configured to hash a string of arbitrary length to a fixed length string; the input to the Hash( ) function is the counter value i padded or concatenated with the basename string bsn; and mod is a modular arithmetic operation ("modulo"). If either or both of the verification checks performed by the TPM device 110 at blocks 416 and 418 fails, the TPM device 110 rejects B as invalid and no digital signature is generated. If both of the verification checks performed by the TPM device 110 at blocks 416 and 418 are successful, then the signing process continues as described above.

The method 400 is described in the context of a particular elliptic curve-based DAA scheme; however, it should be understood that aspects of the method 400 can apply to any elliptic curve-based DAA scheme. Also, while steps of particular processes or methods disclosed herein may be enumerated in a particular order, it should be understood that such order is merely illustrative, and that any of the steps of a particular process or method, or individual methods or processes themselves, may be executed contemporaneously with other steps, methods and/or processes and/or executed in different sequential orders in other embodiments.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected. Further, while aspects of the present disclosure have been described in the context of a hardware-based transactional memory system, it will be understood that the various aspects have other applications, for example, in contexts other than the TPM, and in any elliptic curve-based DAA application in which the signing operation is split between two devices, one of which has access to greater computational resources than the other.

The invention claimed is:

1. At least one non-transitory computer accessible medium comprising a plurality of instructions that in response to being executed cause a computing device to:
store, at a first computing device, a private key configured to associate the first computing device with a group of trusted computing devices;
obtain, at a second computing device communicatively coupled to the first computing device, a basename and a membership credential associated with the private key;
compute, at the second computing device, a basepoint using the basename as input to a first cryptographic hash function, the first cryptographic hash function configured to output a point on an elliptic curve; and
determine, at the first computing device, whether the basepoint is valid using a second cryptographic hash function configured to output a fixed length string.

2. The at least one non-transitory computer accessible medium of claim 1, wherein the plurality of instructions cause the computing device to receive, at the second computing device, the basename from a third computing device communicatively coupled to at least the second computing device.

3. The at least one non-transitory computer accessible medium of claim 1, wherein the plurality of instructions cause the computing device to generate the basename using a random generator.

4. The at least one non-transitory computer accessible medium of claim 1, wherein the plurality of instructions cause the computing device to use a counter associated with the first cryptographic hash function as input to the second cryptographic hash function.

5. The at least one non-transitory computer accessible medium of claim 4, wherein the plurality of instructions cause the computing device to use a concatenation of the counter and the basename as input to the second cryptographic hash function.

6. The at least one non-transitory computer accessible medium of claim 4, wherein the plurality of instructions cause the computing device to send the basepoint, the basename, and the counter to the first computing device.

7. The at least one non-transitory computer accessible medium of claim 1, wherein the plurality of instructions cause the computing device to perform a modular arithmetic operation on the output of the second cryptographic hash function using a parameter q of the elliptic curve.

8. The at least one non-transitory computer accessible medium of claim 7, wherein q is a prime number.

9. The at least one non-transitory computer accessible medium of claim 7, wherein the basepoint comprises an "x" coordinate and a "y" coordinate, and the plurality of instructions cause the computing device to compare, at the first computing device, the output of the second cryptographic hash function modulo q to the x coordinate of the basepoint.

10. The at least one non-transitory computer accessible medium of claim 9, wherein the plurality of instructions cause the computing device to determine, at the first computing device, whether to accept or reject the basepoint based on the comparing.

11. The at least one non-transitory computer accessible medium of claim 10, wherein the plurality of instructions cause the computing device to generate, at the second computing device, a digital signature including the basepoint, if the basepoint is accepted.

12. The at least one non-transitory computer accessible medium of claim 11, wherein the plurality of instructions cause the computing device to determine, at a third computing device communicatively coupled to at least the second computing device, whether the digital signature is valid.

13. The at least one non-transitory computer accessible medium of claim 1, wherein the plurality of instructions cause the computing device to select an elliptic curve G1 having an order p, where p is a prime number, and determine, at the first computing device, whether the basepoint is a valid point on G1.

14. The at least one non-transitory computer accessible medium of claim 13, wherein the basepoint comprises an "x" coordinate and a "y" coordinate, and the plurality of instructions cause the computing device to compare, at the first computing device, the output of the second cryptographic hash function modulo q, where q is a parameter of the elliptic curve, to the x coordinate of the basepoint.

15. The at least one non-transitory computer accessible medium of claim 14, wherein the plurality of instructions cause the computing device to determine, based on the determining of whether the basepoint is a valid point on G1 and the comparing of the output of the second cryptographic hash function modulo q to the x coordinate of the basepoint, whether to accept or reject the basepoint.

16. A Trusted Platform Module (TPM) device comprising:
at least one processor; and
computer circuitry coupled to the at least one processor, the computer circuitry being arranged to cause the at least one processor to:
determine a membership credential configured to identify the TPM device as a trusted computing device;
receive a basepoint, a basename, and a counter from a host computing device communicatively coupled to the TPM device, the basepoint calculated by the host computing device using a first cryptographic hash function configured to output a point on an elliptic curve, the counter associated with the first cryptographic hash function; and
determine whether the basepoint is valid using a second cryptographic hash function configured to output a fixed length string.

17. The TPM device of claim 16, wherein to determine whether the basepoint is valid comprises to:
compare the output of the second cryptographic hash function to an "x" coordinate of the basepoint;
determine whether the basepoint is a valid point on an elliptic curve G1 having an order p, where p is a prime number; and
determine whether to accept or reject the basepoint based on whether the basepoint is the valid point and whether the output of the second cryptographic hash function is the "x" coordinate of the basepoint.

18. At least one non-transitory computer accessible medium comprising a plurality of instructions that in response to being executed cause a computing device to:
determine a basename;
compute a basepoint using the basename as input to a first hash function configured to output the coordinates of a point on an elliptic curve;
send the basename, the basepoint, and a counter associated with the first hash function to a Trusted Platform Module (TPM) device; and
receive, from the TPM device, an indication of whether the basepoint is accepted or rejected, the indication based on executing by the TPM device of a second hash function configured to output a fixed length string.

19. The at least one non-transitory computer accessible medium of claim 18, wherein the plurality of instructions cause the computing device to generate a digital signature including the basepoint if the basepoint is accepted by the TPM device.

20. The at least one non-transitory computer accessible medium of claim 18, wherein the plurality of instructions cause the computing device to use the basename as input to the first hash function irrespective of how the basename is generated.

21. At least one non-transitory computer accessible medium comprising a plurality of instructions that in response to being executed cause a Trusted Platform Module (TPM) device to:
   determine a membership credential configured to identify the TPM device as a trusted computing device;
   receive a basepoint, a basename, and a counter from a host computing device communicatively coupled to the TPM device, the basepoint calculated by the host computing device using a first cryptographic hash function configured to output a point on an elliptic curve, the counter associated with the first cryptographic hash function; and
   determine whether the basepoint is valid using a second cryptographic hash function configured to output a fixed length string.

* * * * *